(12) United States Patent
Riordan, III et al.

(10) Patent No.: US 7,552,949 B2
(45) Date of Patent: Jun. 30, 2009

(54) JOINT RESTRAINT FOR PIPE FITTINGS

(75) Inventors: John E. Riordan, III, Lynchburg, VA (US); Sean B. Routon, Madison Heights, VA (US)

(73) Assignee: The Harrington Corporation, Lynchburg, VA (US)

( * ) Notice: Subject to any disclaimer, the term of this patent is extended or adjusted under 35 U.S.C. 154(b) by 273 days.

(21) Appl. No.: 11/272,014

(22) Filed: Nov. 14, 2005

(65) Prior Publication Data
US 2007/0108766 A1   May 17, 2007

(51) Int. Cl.
*F16L 37/24*   (2006.01)
(52) U.S. Cl. ................. 285/403; 285/103; 285/252; 285/325; 285/400
(58) Field of Classification Search ............ 285/103, 285/252–253, 325–326, 400, 403, 414
See application file for complete search history.

(56) References Cited
U.S. PATENT DOCUMENTS

| | | | |
|---|---|---|---|
| 4,092,036 A | 5/1978 | Sato et al. | |
| 4,336,959 A | 6/1982 | Roche | |
| 5,456,784 A * | 10/1995 | Cogdill et al. | 156/229 |
| 5,632,513 A * | 5/1997 | Cassel | 285/322 |

* cited by examiner

*Primary Examiner*—Aaron M Dunwoody
*Assistant Examiner*—Fannie Kee
(74) *Attorney, Agent, or Firm*—Nixon & Vanderhye, P.C.

(57) ABSTRACT

A joint restraint includes a split ring terminating in radially outwardly extending flanges. A shell includes a cylindrical sleeve, an annular flange at one end and arms projecting generally tangentially for securement behind lugs on a standard bell end of a fitting. With the split ring disposed within the shell and flanges projecting through a radial opening through the shell, a pipe end may be inserted through the joint restraint into the bell. By compressing the split ring about the pipe end by drawing the flanges toward one another and bolting them in place, relative axial movement of the pipe end and fitting is precluded by engagement of the shell flange and split ring.

19 Claims, 3 Drawing Sheets

US 7,552,949 B2

JOINT RESTRAINT FOR PIPE FITTINGS

BACKGROUND AND SUMMARY OF THE INVENTION

The present invention relates to a joint restraint for pipe fittings and particularly relates to an assembly useful for joining a fitting and a pipe enabling the transfer of thrust loads between the fitting and pipe.

In underground pipe systems, as well as other pipe systems, it is common to connect a pipe to a gasketed fitting. For example, T-fittings are generally connected at opposite ends to pipes and also to a lateral pipe. Other types of fittings include reducers where the fitting is used to reduce the flow diameter from one pipe to another. It will also be appreciated that there are thrust forces associated with the flowing of fluid in the pipes under pressure and that such thrust forces are typically reacted into the surrounding environment. Otherwise, the fittings will essentially be forced off the end of the pipe, i.e., the fitting will blow off of the pipe. Gasketed joints often do not transfer such structural loadings. Joint restraints, however, are typically used on pipe joints and are specifically designed to resist the thrust force at the fitting.

Two such joint restraint systems are disclosed in U.S. Pat. Nos. 4,336,959 and 4,009,036. In the first mentioned patent, a bell at the end of one pipe receives an end of the other pipe. The other pipe includes semi-circular elements secured for example by serrations to such other pipe with bolts extending axially between the joined elements and a retainer ring secured behind the bell of the first pipe. The second patent discloses a plurality of bolts to secure an annular body to an end of one pipe received in a flanged end of another pipe. The flanged end and the annular body are secured to one another by axially extending bolts. In both of these patents a significant number of parts are utilized and which require assembly on site. These parts are also arranged about the joint in a manner obscuring certain of the couplings between the pipes. For example, inspection of the pipes lying in a trench to insure proper coupling therebetween using these joint systems is virtually impossible. There is thus developed a need for a joint restraint which utilizes relatively few parts, is easy to assemble and can be readily visually inspected to insure a proper coupling.

In accordance with the preferred aspect of the present invention, there is provided a joint restraint for coupling a pipe and a fitting wherein loadings, e.g., axial thrust forces, are transferred between the fitting and the pipe reducing any need for thrust blocks or other mechanisms at the installation site for reacting the thrust loads into the surrounding environment. The joint restraint includes a shell having a pair of arms for engaging behind lateral lugs projecting from the fitting. The shell also includes a lateral opening for receiving the radially projecting flanges of a clamp ring received within the interior of the shell. With the pipe inserted through the shell and clamp ring and into the open end of the fitting, the lateral arms on the shell engage behind the lugs on the fitting. By closing the ring about the pipe and thereby securing the pipe and ring against axial movement relative to one another, the ring serves as a stop for the shell precluding axial movement of the fitting from the pipe. The engagement of the shell arms and the lugs on the fitting preclude axial movement of the pipe from the fitting. Thus, the pipe and the fitting are restrained from axial movement relative to one another by transfer of loads from one to the other through the shell and clamp ring. It will be appreciated that the joint restraint is compact and may be handled as a single unit requiring only one actuation, i.e. turning a bolt, to secure the clamp ring to the pipe. Problems associated with asymmetrical loading of the pipe and fitting connections are avoided notwithstanding the use of a single bolt to secure the clamp ring to the pipe. Also, the joint restraint is modular as it can be used on any compatible existing fitting, is inexpensive to manufacture and is low in cost in comparison with prior joint restraints.

DETAILED DESCRIPTION OF THE DRAWINGS

Figure 1:
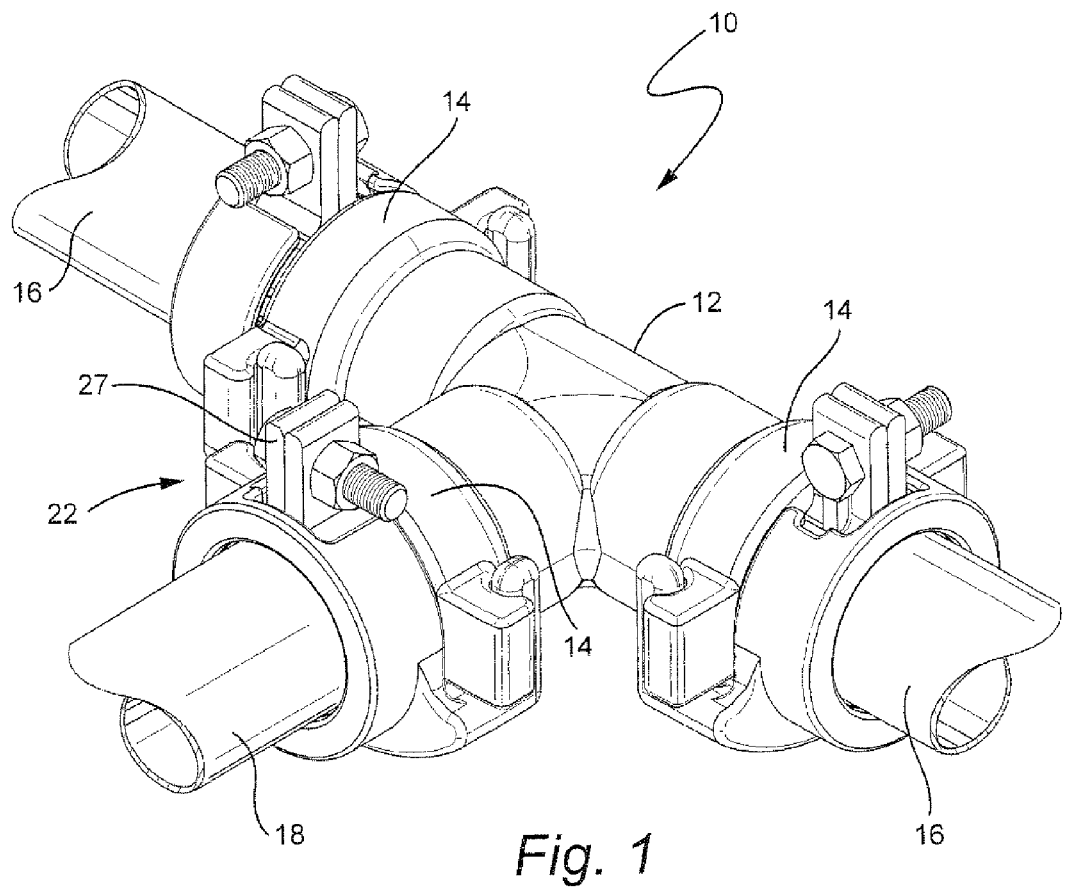
FIG. 1 is a perspective view of a fitting joining two axially aligned pipes and a lateral pipe to one another using a joint restraint system according to the present invention.
Figure 4:
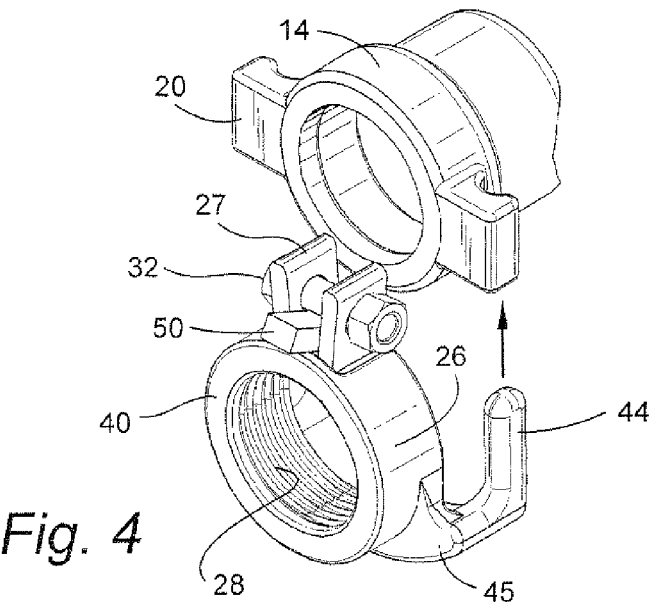
FIGS. 4, 5 and 6 illustrate respective steps in the assembly of the joint restraint to the fitting and pipe.
Figure 7:
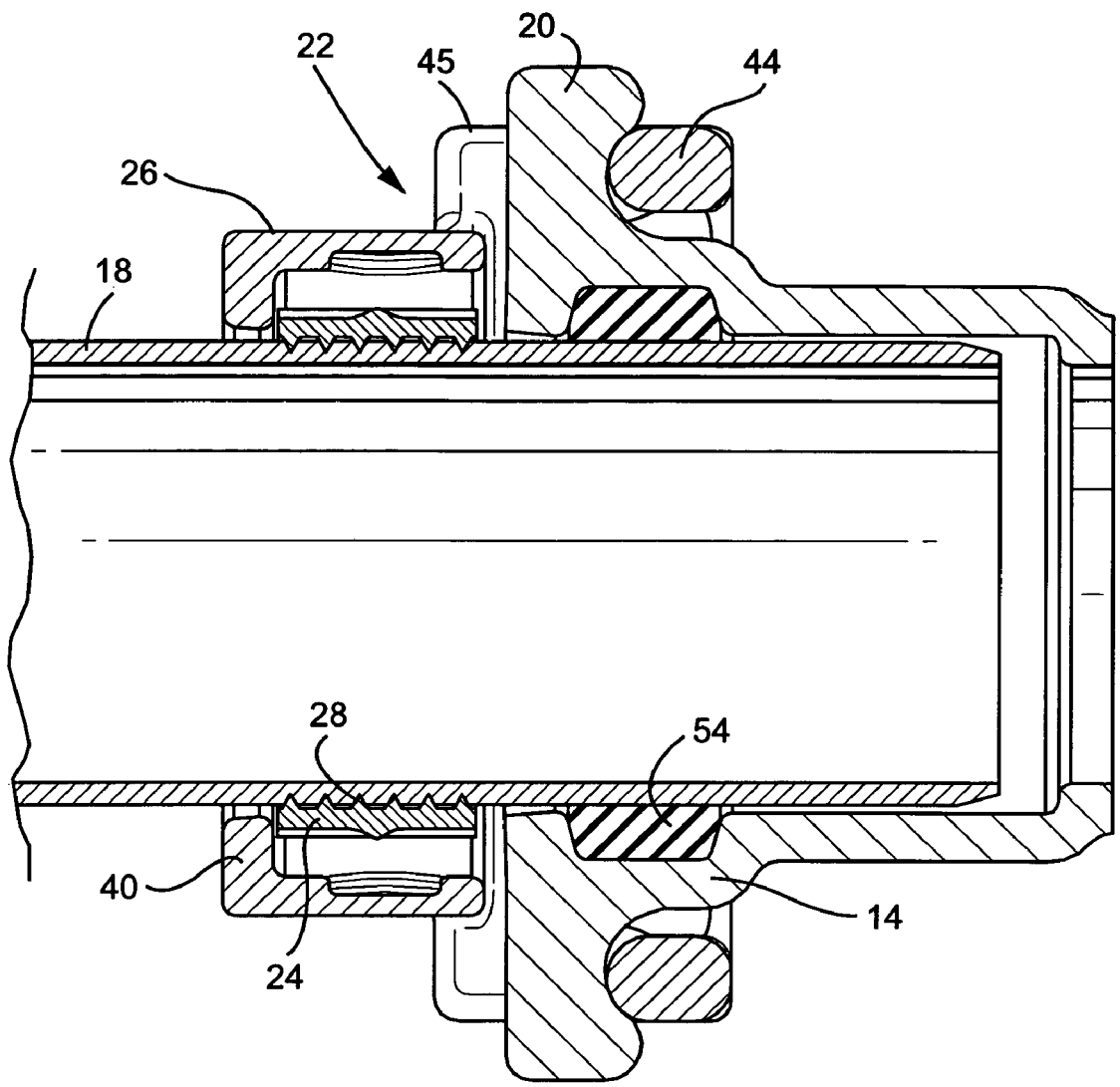
FIG. 7 is a fragmentary enlarged cross-sectional view illustrating the joint restraint hereof in an assembled condition with the fitting and pipe.

Referring now to FIG. 1, there is illustrated a pipe joint generally designated 10 which, in the illustrated embodiment, includes a Tee-shaped fitting 12 having bells 14 at axially aligned opposite ends for receiving the ends of axially aligned pipes 16. Fitting 12 also has a bell 14 for receiving the end of a lateral pipe 18. As best illustrated in FIGS. 4 and 7, each of the bells 14 is a substantially cylindrical, closed-periphery fitting that includes a pair of laterally (i.e., radially outwardly) extending lugs 20. The fitting 12 is of a standard construction and the fitting as well as the pipes 16 and 18 may be formed of any conventional materials, for example, cast iron as used in underground piping systems. In FIGS. 1 and 7, the rigid pipes 16 and 18 are coupled to the respective bells 14 of the fitting 12 by joint restraints generally designated 22.

Figure 2:
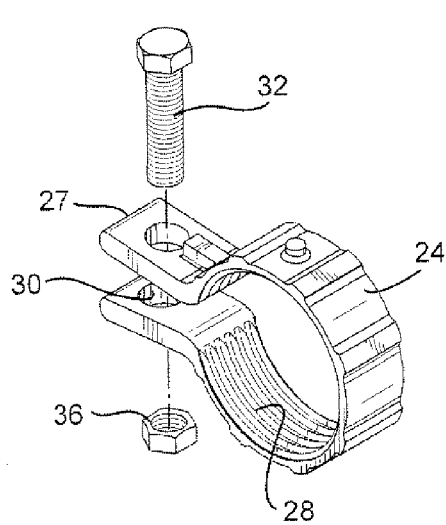
FIG. 2 is a perspective view of a clamp ring forming part of the joint restraint hereof.
Figure 3:
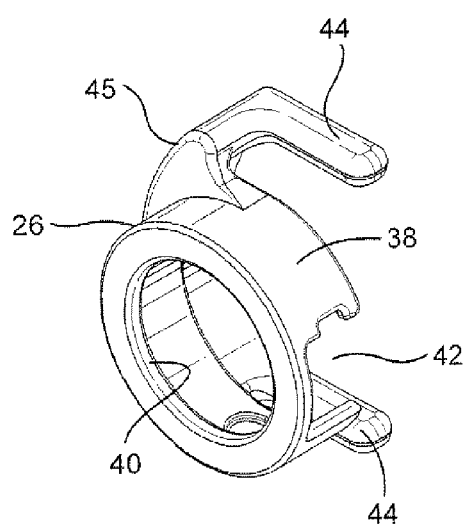
FIG. 3 is a perspective view of a shell forming part of the joint restraint hereof.

Referring to FIGS. 2 and 3, each of the joint restraints 22 includes a grip or clamp ring 24 and a shell 26. Referring to FIG. 2, the grip ring 24 constitutes a split ring terminating short of a full 360° circle in a pair of radially outwardly projecting flanges 27. The interior surface of the split ring 24 has serrations 28 for facilitating engagement and securement of the clamp ring to the pipe end which is receivable in the joint restraint for coupling the pipe and fitting to one another. The flanges 27 have openings 30 for receiving a bolt 32 (FIGS. 2 and 4) to which a nut 36 may be applied to draw the flanges 27 toward one another and secure the clamp ring 24 about the pipe end. It will be appreciated that one of the openings through the flanges 27 may be screw-threaded for cooperation with the threads on a bolt whereby a nut 36, while preferable, is not required to secure the grip ring about the pipe end.

Referring now to FIG. 3, the shell 26 includes an annulus having a cylindrical wall 38 and a radially inwardly directed flange 40 at one end of shell 26. It will be appreciated that while a continuous flange 40 is illustrated and is preferable, a series of flanges spaced circumferentially one from the other about the shell may be utilized. Shell 26 also includes a radial opening 42. Opening 42 is open at the end of the shell 26 opposite the flange 40. Opening 42 is sized to receive the flanges 27 of the grip ring 24 which ring 24 is inserted axially into shell 26 and prior to drawing the flanges toward one another to secure the grip ring about the pipe end. Shell 26 also includes a pair of arms 44. The arms 44 are carried on axially extending extensions 45 at locations spaced radially outwardly of the cylindrical surface 38. The extensions 45 extend axially in a direction away from the flange 40. The arms 44, preferably integrally formed with the extensions 45 and shell 26, project in a generally tangential direction and are located such that the lugs 20 of the bells may be received between the arms 44 and the annular end face of the shell 26 remote from flange 40.

The assembly of the joint restraint will now be described in conjunction with FIGS. 4, 5 and 6. To connect one or more of the pipe ends, e.g., pipes 16 or 18 to corresponding bells 14 of the fitting 12, the grip ring 24 is located axially within the cylindrical sleeve 38 of shell 26. The flanges 27 of the grip ring are received in the radial opening 42 of shell 26 and project radially outwardly from shell 26 as illustrated in FIG. 4. It will be appreciated from a review of FIGS. 3 and 4 that the radial opening 42 lies generally medially between the extensions 45 and hence the arms 44. Thus, as illustrated in FIG. 4, the shell and grip ring are oriented with the flanges 27 projecting radially such that the shell 26 can be displaced radially into axial alignment with the fitting with the arms 44 engaging behind the lugs 20 of the bell 14, i.e., the arms engage sides of the lugs facing axially away from the shell. Note that there is no requirement for any seal between the shell or grip ring on the one hand, and the bell on the other hand.

Figure 5:
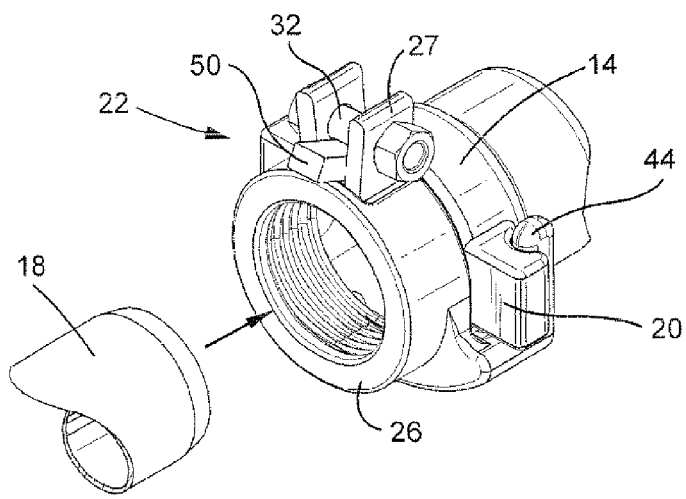
Figure 6:
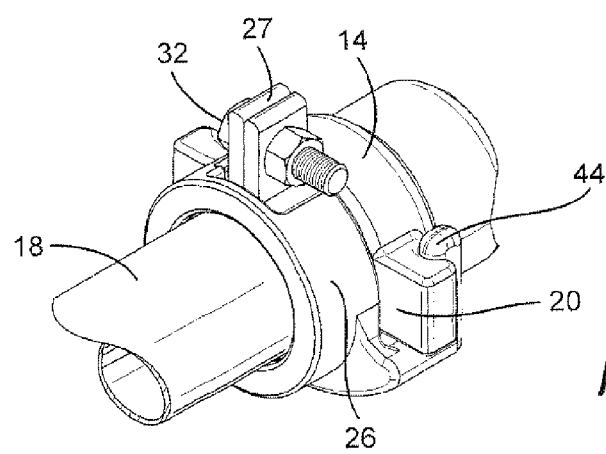

With the shell 26 and grip ring positioned on the fitting as illustrated in FIG. 5, an end of a pipe, e.g., pipe 16 or 18, is inserted into the joint restraint 22 and into the bell 14 as illustrated in the cross-sectional view of FIG. 7. With the pipe end inserted, a block 50 maintaining the flanges 27 spaced from one another enabling insertion of the pipe end into the bell is removed. The flanges 27 are then drawn toward one another by inserting the bolt 32 and threading the bolt on the nut 36. By drawing the flanges toward one another, the serrations 28 of the grip ring 24 engage the pipe end securing the pipe end and grip ring against relative axial movement. In FIG. 7, an annular gasket 54 is provided as conventional along the interior surface of the bell which seals about the pipe end in the final configuration of the joint. In that latter configuration, axial movement of the pipe end in either axial direction is prevented. For example, withdrawing movement of the pipe end from the bell 14 is prevented by the engagement of the clamp ring 24 against the flange 40 of the shell 26 which, in turn, is secured to the bell 14 by the arms 44 engaging lugs 20. Withdrawing movement of the fitting from the bell in the opposite axial direction is precluded by engagement of the lugs 20 and arms 44 and the engagement of the flange 40 against an end face of the clamp ring 24. Thus, axial thrust forces tending to separate the bell and pipe end from one another are reacted substantially within the joint per se which in most cases eliminates any need for thrust blocks or other types of axial restraints.

It will also be appreciated that the joint is formed by using only two component parts, i.e., the grip ring and the shell, as well as only a single bolt for securing the pipe end to the bell. Additionally, the orientation of the radial opening 42 and flanges 27 enables location of the flanges and bolt on an upwardly facing portion of the joint restraint where visual inspection of the joint may be readily obtained from above the joint. Also in that orientation, the engagement of the arms and lugs may be viewed from above the joint. Note also that in the initial installation of the grip ring within the shell, the grip ring is rotatable relative to the shell to a limited extent and is self centering with respect to the axis of the pipe end and the bell of the fitting. That is, contrary to prior grip rings which are typically provided in two semi-circular halves clamped together which, when secured about a pipe end may be pulled to one side of the joint, thus unloading one side of the seal and endangering the integrity of the seal, the present invention provides a single split ring which automatically centers itself about the pipe upon its securement to the pipe end.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A joint restraint for a rigid pipe, said joint restraint comprising:
    an annular shell, formed with a radial opening, having a cylindrical surface and an axial entry opening for receiving an end portion of the pipe, and a pair of arms spaced radially outwardly away from said cylindrical surface and engaging a pair of radially outwardly extending circumferentially-spaced lugs on a substantially cylindrical, closed periphery pipe fining having a through-opening, wherein a rigid pipe is receivable within said through-opening of the fitting;
    a split ring receivable within said shell and having a pair of flanges projecting radially from opposite ends thereof and through said radial opening of said shell; and
    a closure element engaging said flanges for closing the ring about the end portion of the pipe and securing the pipe end portion and ring against relative axial movement;
    said shell engaging said ring enabling the ring to provide an axial stop for restraining movement of the fitting axially away from the pipe.

2. A joint restraint according to claim 1, wherein said ring has a plurality of serrations for engaging the pipe and securing the ring to the pipe.

3. A joint restraint according to claim 1, wherein said shell includes at least one radially inwardly directed flange for engaging the ring.

4. A joint restraint according to claim 3, wherein said shell flange is annular about the axial opening of the shell which receives the pipe end portion.

5. A joint restraint according to claim 1, wherein said arms lie on opposite sides of said shell, said radial opening being located substantially medially between said arms.

6. A joint restraint according to claim 1, wherein said closure element includes a bolt extending between and cooperable with the flanges to tighten the ring about the pipe.

7. A joint restraint according to claim 1, wherein the radial opening opens axially through an end of said shell opposite said entry opening enabling axial insertion of the ring into the shell and the flanges into the radial opening.

8. A joint restraint according to claim 1, wherein said shell includes at least one radially inwardly directed flange about the entry opening for engaging the ring, said shell being annular and said arms lying on opposite sides of said shell, said radial opening being located substantially medially between said arms.

9. A joint restraint according to claim 8, wherein said ring has a plurality of serrations for engaging the pipe and securing the ring to the pipe.

10. A joint restraint according to claim 8, wherein the radial opening opens axially through an end of said shell opposite said entry opening enabling axial insertion of the ring into the shell and the flanges into the radial opening.

11. A joint restraint according to claim 1, wherein said arms lie on generally diametrical opposite sides of said shell and extend generally in a tangential direction.

12. A joint comprising:

a fitting having an axially-oriented opening and a pair of radially outwardly projecting external lugs;

a rigid pipe received in said axially-oriented opening of said fitting;

an annular shell having an axial through-opening in axial registration with said axially-oriented opening of said fitting and disposed about the pipe, a pair of arms projecting laterally from said shell and engaging said lugs on sides of said lugs facing axially away from the shell, and a radial opening;

a split ring within the shell about said pipe; and means for closing the split ring about the pipe and securing the ring and pipe to one another against relative axial movement;

said ring engaging said shell for restraining the relative axial movement of said fitting and said pipe.

13. A joint according to claim 12 wherein said closing means includes a pair of laterally projecting flanges and a bolt extending between and cooperable with the flanges to close the ring about the pipe.

14. A joint according to claim 12, wherein said shell includes at least one radially inwardly directed flange thereabout for engaging the ring.

15. A joint according to claim 12, wherein said arms lie on opposite sides of said shell, said radial opening being located substantially medially between said arms.

16. A joint according to claim 12, wherein said closing means includes a pair of laterally projecting flanges and a bolt extending between and cooperable with the flanges to close the ring about the pipe, the radial opening through an end of said shell enabling insertion of the ring into the shell and the flanges into the radial opening.

17. A joint according to claim 12, wherein said shell includes at least one radially inwardly directed flange engaging the ring, said shell being annular and said arms lying generally on opposite diametrical sides of said shell, said radial opening being located substantially medially between said arms.

18. A joint according to claim 12, wherein said shell includes at least one radially inwardly directed flange engaging the ring, said shell being cylindrical and said arms lying generally on opposite diametrical sides of said shell and extending generally tangentially thereof.

19. A joint according to claim 18, wherein said shell and said fitting lie in axial alignment with one another, said arms engaging said lugs on sides thereof facing axially away from said shell, said radial opening being circumferentially spaced about said shell from said arms.

* * * * *